United States Patent [19]

Isoyama et al.

[11] Patent Number: 4,680,137
[45] Date of Patent: Jul. 14, 1987

[54] LIQUID CRYSTAL ESTER COMPOUND

[75] Inventors: Toyoshiro Isoyama; Tetsuya Ogawa, both of Yokohama; Shigeru Sugimori, Musashino, all of Japan

[73] Assignee: Chisso Corporation, Japan

[21] Appl. No.: 869,682

[22] Filed: Jun. 2, 1986

[30] Foreign Application Priority Data

Jun. 10, 1985 [JP] Japan .................. 60-125490
Jun. 25, 1985 [JP] Japan .................. 60-138783

[51] Int. Cl.⁴ .................. C09K 19/32; C07C 69/76; C07C 69/74; G02F 1/13
[52] U.S. Cl. .................. 252/299.62; 560/8; 560/56; 560/59; 560/100; 560/102; 560/116; 560/118; 350/350 R; 350/350 S
[58] Field of Search .......... 252/299.5, 299.62, 299.63, 252/299.64, 299.65; 560/56, 59, 100, 102, 116, 118, 8; 350/350 R, 350 S

[56] References Cited

U.S. PATENT DOCUMENTS

| | | | |
|---|---|---|---|
| 3,925,237 | 12/1975 | Ross et al. | 252/299.62 |
| 4,113,647 | 9/1978 | Coates et al. | 252/299.62 |
| 4,119,558 | 10/1978 | Coates et al. | 252/299.62 |
| 4,136,053 | 1/1979 | Steinstrasser et al. | 252/299.65 |
| 4,229,315 | 10/1980 | Krause et al. | 252/299.63 |
| 4,261,652 | 4/1981 | Gray et al. | 252/299.62 |
| 4,279,770 | 7/1981 | Inukai et al. | 252/299.62 |
| 4,340,498 | 7/1982 | Sugimori | 252/299.62 |
| 4,349,452 | 9/1982 | Osman et al. | 252/299.63 |
| 4,391,731 | 7/1983 | Boller et al. | 252/299.62 |
| 4,438,268 | 3/1984 | Zaschke et al. | 252/299.63 |
| 4,473,487 | 9/1984 | Romer et al. | 252/299.65 |
| 4,487,954 | 12/1984 | Sugimori et al. | 252/299.63 |
| 4,584,120 | 4/1986 | Fujii et al. | 252/299.63 |
| 4,610,805 | 9/1986 | Schellenberger et al. | 252/299.62 |
| 4,617,140 | 10/1986 | Eidenschink et al. | 252/299.63 |
| 4,620,938 | 11/1986 | Romer et al. | 252/299.63 |

FOREIGN PATENT DOCUMENTS

| | | | |
|---|---|---|---|
| 57-64645 | 4/1982 | Japan | 252/299.63 |
| 57-91953 | 6/1982 | Japan | 252/299.63 |
| 2116197 | 9/1983 | United Kingdom | 252/299.62 |

OTHER PUBLICATIONS

Demus, D., et al., Aussige Kristalle in Tabellen II, VEB Deutscher Verlag fur Grundstoffindustrie, Leipzig, pp. 70, 73-79, 314-321 (1984).
Coates et al., "The Liquid Crystal Properties of Some Cyano–Substituted Aryl Esters", Mol. Cryst. Liq. Cryst., 37, pp. 249-262 (1976).
Coates et al., "The Liquid Crystal Properties of Some Aromatic Esters Derived from Naphthalene", Mol. Cryst. Liq. Cryst., 41, pp. 197-202 (1978).

Primary Examiner—Teddy S. Gron
Attorney, Agent, or Firm—Leydig, Voit & Mayer

[57] ABSTRACT

A novel liquid crystal ester compound which is useful as a component for TN type nematic liquid crystal composition, raising its nematic-isotropic liquid phase-isotropic liquid phase transition point without increasing its viscosity and a liquid crystal composition containing the same are provided, which ester compound is expressed by the formula

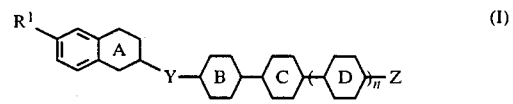

(I)

wherein $R^1$ represents an alkyl group or an alkoxy group each of 1 to 10 carbon atoms;

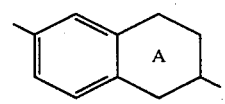

represents

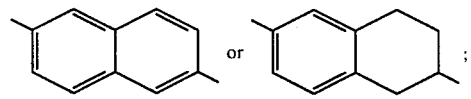

Y represents —COO— or —OCO—; any of

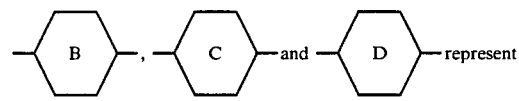

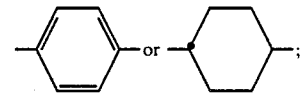

n represents 0 or 1; and Z represents an alkyl group or an alkoxy group each of 1 to 10 carbon atoms, or a halogen atom of F, Cl or Br.

9 Claims, No Drawings

LIQUID CRYSTAL ESTER COMPOUND

BACKGROUND OF THE INVENTION

This invention relates to a novel liquid crystal compound useful for display elements and a liquid crystal composition containing the same.

Display elements utilizing liquid crystals have been broadly used for watches, electric calculators, etc. These liquid crystal display elements utilize the optical anisotropy and dielectric anisotropy of liquid crystal substances, and the liquid crystal phases include nematic liquid crystal phase, smectic liquid crystal phase and cholesteric liquid crystal phase. However, among these, display elements utilizing nematic liquid crystals have been most broadly practically used. Namely, correspondingly to the electrooptical effect which has been applied to liquid crystal displays, display elements are classified into TN (twisted nematic) type, DS (dynamic scattering) type, guest-host type, DAP type, etc. As for liquid crystal substances used for the respective modes, those which exhibit liquid crystal phases within a temperature range as broad as possible are preferred. However, it is the present status that there is no single substance which satisfies the above conditions, but several kinds of liquid crystal substances are mixed with one another or with non-liquid crystal substances, for practical use. Further, the above substances are required to be stable to moisture, light, heat, air, etc. As to nematic liquid crystal compositions of TN mode among them, in order to drive the display elements using the compositions under a low voltage, those having a large positive dielectric anisotropy value (Δε) have been required. Also, in order to raise the response speed, it has been required that the viscosity be as low as possible.

Further, liquid crystal compositions having a large optical anisotropy value (hereinafter abbreviated to Δn) can inhibit occurrence of color unevenness due to a partially non-uniform distance between substrates of liquid crystal display elements, to thereby reduce the distance between the substrates, which results in an advantage that it is possible to increase the intensity of electric field even under the same impressed voltage. Thus compounds having a large Δn as a constituting component of liquid crystal compositions have been required.

The object of the present invention is to provide a novel liquid crystal compound which satisfies these requirements as much as possible, as a component constituting nematic liquid crystal compositions. SUMMARY OF THE INVENTION The present invention resides in
a liquid crystal ester compound expressed by the formula

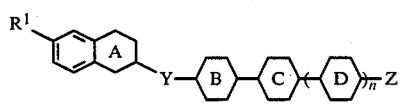

wherein $R^1$ represents an alkyl group or an alkoxy group each of 1 to 10 carbon atoms;

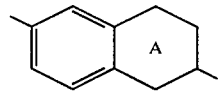

represents

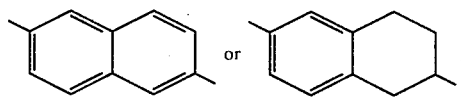

Y represents —COO— or —OCO—; any of

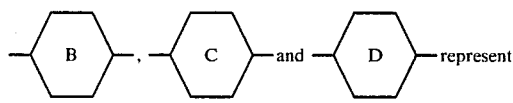

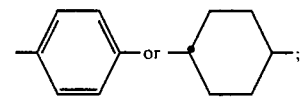

n represents 0 or 1; and Z represents an alkyl group or an alkoxy group each of 1 to 10 carbon atoms, or a halogen atom of F, Cl or Br, and a liquid crystal composition containing at least one of these compounds.

DETAILED DESCRIPTION OF PREFERRED EMBODIMENTS

The compound of the formula (I) of the present invention is a liquid crystal compound which exhibits a nematic liquid crystal phase at relatively high temperatures of 100° C. or higher and has a high clearing point (N-I point) of 200°~300° C. or higher, that is, has a nematic liquid crystal phase range at high temperatures. Further, since its viscosity is low as compared with its molecular weight, the compound has a good compatibility with many other liquid crystal compounds, that is, those of esters, Schiff's bases, biphenyls, phenylcyclohexanes, heterocyclic compounds, etc., and by adding a small quantity of the compound of the present invention to liquid crystal compositions, the compound serves to raise the N-I point of the composition and obtain a liquid crystal composition having a broad mesomorphic range, without increasing the viscosity of the composition. Further, since it has a function of increasing the optical anisotropy value Δn, it serves to obtain a liquid crystal composition used for a high multiplex drive display element needing a large Δn. Further, compounds of the formula (I) wherein Z represents a halogen atom also has a function of increasing Δε of the composition. Among the compounds of the formula (I), those wherein

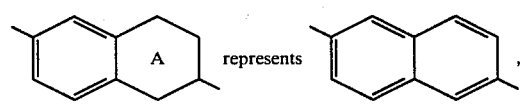

Y represents —COO— and

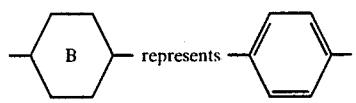

are more preferable. Further, in the case of those wherein Z represents an alkyl group, those wherein

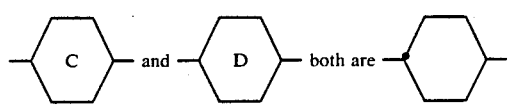

are most preferable, and in the case of those wherein Z represents a halogen atom, those wherein

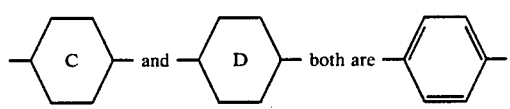

and Z represents F are most preferable. Further, in the case of those wherein $R^1$ and Z each represent an alkyl group, those wherein the alkyl group has 3 to 8 carbon atoms are more preferable. As to concrete examples of these preferable compounds, examples of the former are 6-heptylnaphthalene-2-carboxylic acid-4'-(trans-4-propylcyclohexyl)phenyl ester and 6-pentylnaphthalene-2-carboxylic acid-4-[trans-4-(trans-4-propylcyclohexyl)cyclohexyl]phenyl ester, and examples of the latter are 6-heptylnaphthalene-2-carboxylic acid-4'-fluoro-4-biphenyl ester.

Concrete examples of other liquid crystal compounds constituting liquid crystal compositions together with the compound of the formula (I) are ester liquid crystal compounds such as trans-4-alkylcyclohexanecarboxylic acid-4-alkylphenyl esters, trans-4-alkylcyclohexanecarboxylic acid-4-alkoxyphenyl esters, 4-alkoxybenzoic acid-4-alkylphenyl esters, 4-alkylbenzoic acid-4-cyanophenyl esters, 4-(trans-4-alkylcyclohexyl)benzoic acid-4-cyanophenyl esters, etc., Schiff's base liquid crystal compounds such as 4-alkoxybenzylidene-4-alkanoyloxyanilines, 4-alkoxybenzylidene-4-alkylanilines, 4-alkoxybenzylidene-4-cyanoanilines, etc., biphenyl liquid crystal compounds such as 4'-alkyl-4-cyanobiphenyls, 4'-alkoxy-4-cyanobiphenyls, 4'-alkoxy-4-alkylbiphenyls, etc., phenylcyclohexanes such as trans-4-alkyl-(4-cyanophenyl)cyclohexanes, trans-4-alkyl-(4-alkoxyphenyl)cyclohexanes, etc., heterocyclic liquid crystal compounds such as 5-alkyl-2-(4-cyanophenyl)-1,3-dioxanes, 5-alkyl-2-(4-cyanophenyl)pyrimidines, 5-cyano-2-(4-alkylphenyl)pyrimidines, etc., but the compounds are not limited to these examples.

The content of the compound of the present invention in the composition of the present invention varies depending on the kind of other components to be blended, but usually it is in the range of 1 to 30% by weight, preferably 5 to 15% by weight based on the weight of other components. More concretely, for example, compositions consist of 70 to 99% by weight, preferably 85 to 95% by weight of one kind or mixtures of several kinds of trans-4-alkyl-(4-cyanophenyl)cyclohexanes and 1 to 30% by weight, preferably 5 to 15% by weight of the ester compound(s) of the present invention.

Preparation of the compound

Preparation of the compound of the present invention will be described below.

First, compounds of the formula (I) wherein Y represents —COO— may be obtained by the following pathway:

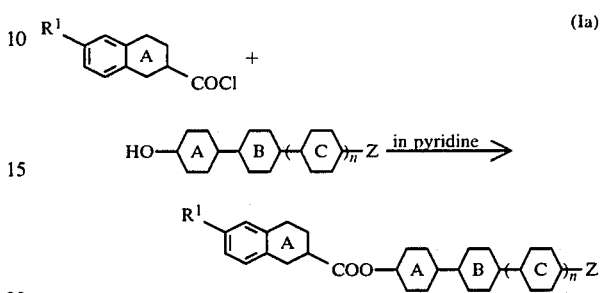

Further, compounds of the formula (I) wherein Y represents —OCO— may be obtained through the following passageway:

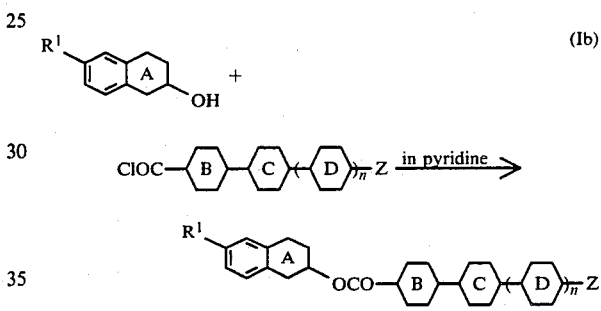

Namely, in either of the above cases, carboxyl chlorides and phenyl derivatives or cyclohexanol derivatives, each corresponding to the final objective compounds are subjected to dehydrochlorination-condensation to obtain the objective compounds.

The compound of the present invention will be described in more detail by way of Examples.

EXAMPLE 1

Preparation of 6-heptylnaphthalene-2-carboxylic acid-4-(trans-4-propylcyclohexyl)phenyl ester (a compound expressed by the formula

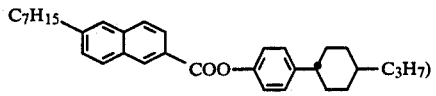

4-(Trans-4-propylcyclohexyl)phenol (1.3 g, 5.9 mmols) was dissolved in pyridine (10 ml), followed by adding to the solution, a solution of 6-heptylnaphthalene-2-carboxyl chloride (1.7 g, 5.9 mmols) dissolved in toluene (10 ml), with stirring, allowing the mixture to stand overnight, adding toluene (50 ml), pouring the mixture in water, washing the resulting toluene layer with 6N-hydrochloric acid, then with 2N-NaOH aqueous solution and further with water, drying over anhydrous sodium sulfate, distilling off toluene and recrystallizing white solids from a mixed solvent of ethanol and ethyl acetate to obtain to objective 6-heptyl-2-naphthalenecarboxylic acid-4-(trans-4-propylcyclohexyl)- phenyl ester (1.8 g, 3.8 mmols) (yield: 65%). This product exhibited liquid crystal phases and its crystalline-nematic phase transition point (C-N point) was 111.9° C. and its N-I point was 232.6° C. Further its elemental analysis values were C: 85.11%, H: 9.03% and accorded nearly with the calculated values in terms of $C_{33}H_{42}O_2$ (C: 84.21%, H: 8.99%).

EXAMPLE 2

Preparation of 6-pentylnaphthalene-2-carboxylic acid-4-[trans-4-(trans-4-propylcyclohexyl)cyclohexyl]phenyl ester (a compound expressed by

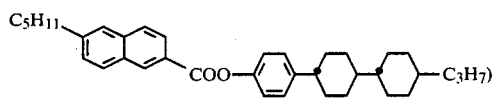

Preparation was carried out in the same manner as in Example 1 except that 6-heptylnaphthalene-2-carboxyl chloride and 4-(trans-4-propylcyclohexyl)phenol in Example 1 were replaced by 6-pentylnaphthalene-2-carboxyl chloride and 4-[trans-4-(trans-4-propylcyclohexyl)cyclohexyl]phenol, respectively, to obtain the objective 6-pentylnaphthalene-2-carboxylic acid-4-[trans-4-(trans-4-propylcyclohexyl)cyclohexyl]phenyl ester. This product had a crystalline-smectic phase transition point (C-S point) of 140.7° C., a smectic phase-nematic phase transition point (S-N point) of 174.7° C. and a N-I point of 300° C. or higher. Further its elemental analysis values were C: 84.93%, H: 9.15% and accorded nearly with the calculated values in terms of $C_{37}H_{48}O_2$ (C: 84.68%, H: 9.22%).

EXAMPLE 3

Preparation of 6-heptylnaphthalene-2-carboxylic acid-4'-fluoro-4-biphenylyl ester (a compound

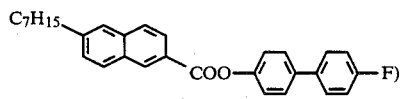

Preparation was carried out in the same manner as in Example 1 except that 4-(trans-4-propylcyclohexyl)phenol in Example 1 was replaced by 4'-fluoro-4-hydroxybiphenyl to obtain the objective 6-heptyl-2-naphthalenecarboxylic acid-4'-fluoro-4-biphenylyl ester. This product had a crystalline-smectic phase transition point (C-S point) of 114.3°~114.9° C., a smectic phase-nematic phase transition point (S-N point) of 187.6°~187.9° C. and a N-I point of 228.5°~229.7° C. Further its elemental analysis values were C: 81.91%, H: 6.60%, and accorded well with the calculated values in terms of $C_{30}H_{29}FO_2$ (C: 81.79%, H: 6.63%).

In addition, a compound of the formula (I) wherein

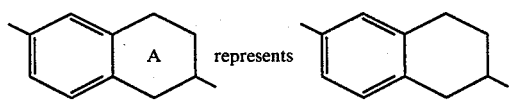

and —Y— represents —COO— can also be prepared in the same manner as in Example 1, by replacing the above 6-substituted naphthalene-2-carboxyl chloride by 6-substituted-1,2,3,4-tetrahydronaphthalene-2-carboxyl chloride.

EXAMPLE 4

(Composition example)

A liquid crystal composition (A) consisting of

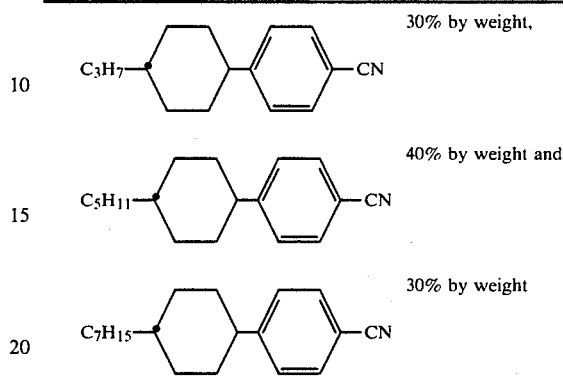

has a N-I point of 52.1° C., a Δε of 11.2 and a Δn of 0.119.

In this liquid crystal composition (A) (85% by weight) was dissolved 6-heptylnaphthalene-2-carboxylic acid-4-(trans-4-propylcyclohexyl)phenyl ester (15% by weight). The resulting liquid crystal composition had a N-I point of 73.1° C. and a Δn of 0.13, that is, both values increased to a large extent, and its Δε increased a little.

EXAMPLE 5

(Composition example)

In the liquid crystal composition (A) used in Example 4 (85% by weight) was dissolved 6-pentylnaphthalene-2-carboxylic acid-4-[trans-4-(trans-4-propylcyclohexyl)cyclohexyl]phenyl ester (15% by weight), and the resulting composition had a N-I point of 83.6° C. and a Δn of 0.134, that is, these values increased to a large extent. Its Δε was 11.0, that is, slightly decreased.

EXAMPLE 6

(Composition example)

In the liquid crystal composition (A) (90% by weight) used in Example 4 was dissolved 6-heptyl-2-naphthalenecarboxylic acid-4-(4'-fluoro)biphenylyl ester (10% by weight) of Example 3 of the present invention. The resulting liquid crystal composition had a N-I point of 63.3° C. and a Δn of 0.131, that is, both the values increased to a large extent. Further, the Δε also increased to 12.0.

What we claim is:

1. A liquid crystal ester compound expressed by the formula

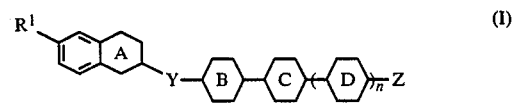

wherein $R^1$ represents an alkyl group or an alkoxy group each of 1 to 10 carbon atoms;

represents

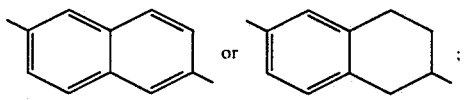

Y represents —COO— or —OCO—; any of

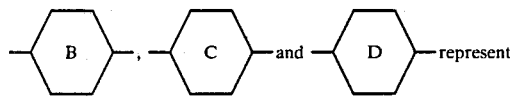

in represents 0 or 1; and Z represents an alkyl group or an alkoxy group each of 1 to 10 carbon atoms, or a halogen atom of F, Cl or Br.

2. A liquid crystal ester compound expressed by the formula

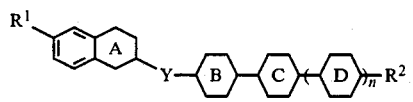 (II)

wherein $R^1$ and $R^2$ each represent an alkyl group or an alkoxy group each of 1 to 10 carbon atoms;

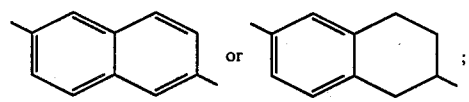

represents

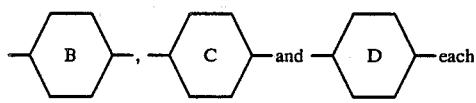

Y represents —COO— or —OCO—;

-⟨B⟩-, -⟨C⟩- and -⟨D⟩- each represent 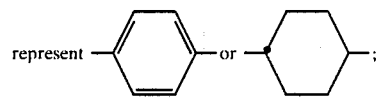

and n is zero or 1.

3. A liquid crystal ester compound expressed by the formula

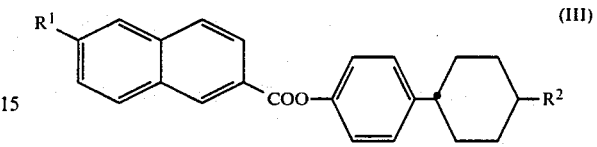 (III)

wherein $R^1$ and $R^2$ each represent an alkyl group or an alkoxy group each of 1 to 10 carbon atoms.

4. A liquid crystal ester compound expressed by the formula

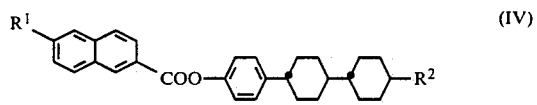 (IV)

wherein $R^1$ and $R^2$ each represent an alkyl group or an alkoxy group each of 1 to 10 carbon atoms.

5. A liquid crystal ester compound expressed by the general formula

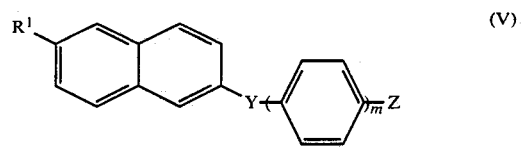 (V)

wherein $R^1$ represents an alkyl group or an alkoxy group each of 1 to 10 carbon atoms; Y represents —COO— or —OCO—; Z represents a halogen atom of F, Cl or Br; and m represents 2 or 3.

6. A liquid crystal ester compound expressed by the formula

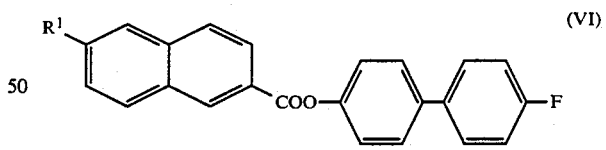 (VI)

wherein $R^1$ represents an alkyl group or an alkoxy group each of 1 to 10 carbon atoms.

7. A liquid crystal composition having at least two components at least one of which is a liquid crystal ester compound expressed by the formula (I) as set forth in claim 1.

8. A liquid crystal composition having at least two components at least one of which is a liquid crystal ester compound expressed by the formula (II) as set forth in claim 2.

9. A liquid crystal composition having at least two components at least one of which is a liquid crystal ester compound expressed by the formula (V) as set forth in claim 5.

* * * * *